United States Patent [19]

Brois et al.

[11] 4,340,694

[45] Jul. 20, 1982

[54] CROSSLINKING AND CHEMICAL MODIFICATION AGENTS FOR OLEFIN CONTAINING POLYMERS

[75] Inventors: Stanley J. Brois, Westfield; Gary Ver Strate, Matawan, both of N.J.

[73] Assignee: Exxon Research & Engineering Co., Florham Park, N.J.

[21] Appl. No.: 96,526

[22] Filed: Nov. 21, 1979

Related U.S. Application Data

[60] Division of Ser. No. 874,656, Feb. 2, 1978, Pat. No. 4,230,337, which is a continuation of Ser. No. 634,266, Nov. 21, 1975, abandoned.

[51] Int. Cl.$^3$ .......................... C08C 19/20; C08F 8/34
[52] U.S. Cl. ..................................... 525/342; 521/61; 525/343; 528/272
[58] Field of Search ................ 528/272; 525/326, 343, 525/342; 521/61, 63

[56] References Cited

U.S. PATENT DOCUMENTS

| | | | |
|---|---|---|---|
| 1,532,225 | 4/1925 | Cadwell | 260/793 |
| 4,160,079 | 7/1979 | Edmondson | 526/295 |

*Primary Examiner*—C. A. Henderson
*Attorney, Agent, or Firm*—John J. Mahon; Harvey L. Cohen

[57] ABSTRACT

There are disclosed monofunctional and polyfunctional aliphatic oxycarbonylsulfenyl chlorides having general utility as crosslinking, coupling and chemical modification agents for olefin containing polymers, particularly unsaturated rubber hydrocarbon elastomers.

7 Claims, No Drawings

CROSSLINKING AND CHEMICAL MODIFICATION AGENTS FOR OLEFIN CONTAINING POLYMERS

This is a division of application Ser. No. 874,656 filed Feb. 2, 1978, now U.S. Pat. No. 4,230,387, issued Oct. 28, 1980 which is a continuation of application Ser. No. 634,266 filed Nov. 21, 1975, now abandoned.

BACKGROUND OF THE INVENTION

This invention relates to reactive agents for olefinically unsaturated polymers. More particularly, this invention relates to the coupling, crosslinking or chemical modification of polymers containing an unsaturated linkage wherein the polymer is reacted with an organic compound containing at least one oxycarbonylsulfenyl chloride group, that is, one —OC(:O)SCl group.

Weiss et al. in German Published Application No. 1,568,632 disclose the reaction of certain alcohols with chlorocarbonyl sulfenyl chloride to form compounds which are useful in the present invention.

Numerous methods are known in the art for crosslinking unsaturated polymers, particularly the crosslinking of the elastomeric diene rubber hydrocarbon polymers. However, it is always desirable to provide more efficient chemical crosslinking agents, particularly for use in connection with the crosslinking of polymers having only a limited number of olefin sites available. It is also desirable to provide organic chemical modification agents which allow the facile introduction of reactive functional groups into olefin-containing polymers. Such more effective crosslinking agents are especially suitable in connection with the coupling of unsaturated polymers having unsaturation only at the end of the chain, since these polymers are typically less susceptible to crosslinking agents.

In accordance with the present invention, there has been discovered a method for coupling, crosslinking or chemically modifying olefinically unsaturated polymers which comprises reacting the polymer at the site of olefinic unsaturation with an aliphatic oxycarbonylsulfenyl chloride represented by the general formula $R(OC(:O)SCl)_n$ prepared by reacting an alcohol or polyol with chlorocarbonyl sulfenyl chloride, where n is an integer of one or more and R represents a saturated aliphatic radical, being the residual portion of a monohydric or polyhydric alcohol or a polyalkylene ether polyol. R may contain substituent groups as defined herein.

The olefin-reactive compounds of the present invention are employed in two basic reactions, depending on their functionality, chemical modification or crosslinking. When employed as chemical modification agents, without crosslinking being desired, the reactive compounds of the present invention will have the formula R—OC(:O)SCl, R representing a saturated organic aliphatic radical, preferably of from 1 to 12 carbon atoms. Since the olefin addition reaction proceeds by addition of the —SCl moiety of the aliphatic oxycarbonylsulfenyl chloride to the olefinic linkage, a functional group may be present in the R radical, provided it is non-reactive or compatible with the —OC(:O)SCl group, and the olefin polymer is thereby modified by introduction of such functional groups. A particularly preferred embodiment resides in the hydroxy-functionalization of olefin polymers by providing compounds where R is hydroxy-alkyl, especially $C_1$ to $C_{12}$ hydroxy alkyl. This allows polymers to be prepared having one or more pendant —OH functional groups. The polymers thereby become suitable for reaction with species such as polyisocyanates to form urethane reaction products, either rigid or flexible foams or elastomers, which have a variety of structural and insulation uses, as is well known to those in the polyurethane field. Chemical modification may be combined with crosslinking when the reactive agents of the present invention are used in polyfunctional form as described hereinbelow.

When employed in the preferred embodiment comprising crosslinking reactions, the aliphatic oxycarbonylsulfenyl chloride compounds of the present invention will be employed in polyfunctional form and may therefore be represented by the general formula $R(OC(:O)SCl)_n$ where n is an integer of at least 2 and preferably 2 to 3. When n is 2, that is, when two olefin-reactive oxycarbonylsulfenyl chloride groups are present, the compounds of the present invention will serve as a crosslinking moiety between two unsaturated polymer molecules. If three or more of such reactive groups are present, the crosslinking agents can link three or more sites of olefinic unsaturation at a single coupling point and thereby allow for the formation of network polymer systems, even if the unsaturated polymer has only two olefin sites.

Chemical modification may be combined with crosslinking in accordance with the present invention. Thus, the R radical of the general formula $R(OC(:O)SCl)_n$ may be a simple unsubstituted alkyl group or it may be a substituted alkyl group, the substituents being functional groups such as hydroxyl, chloro, nitro, oxy, oxycarbonyl or a $C_1$–$C_4$ alkyl or alkoxy-substituted silyl group. The R radical should not contain any olefinic unsaturation since undesirable side reactions may result. Functional groups, such as amino or epoxy, which may react with the oxycarbonylsulfenyl chloride should not be present. Particularly useful are mono- and polyhydroxy substituted alkyl radicals, since these compounds provide a means by which a reactive hydroxyl functional group or groups may be incorporated into a crosslinked polymer system. Such crosslinking agents, particularly where the R group contains 1 or 2 —OH substituents and n is 2 or 3, constitute a preferred embodiment of the present invention.

The crosslinking and chemical modification agents of the present invention may be prepared by reacting chlorocarbonylsulfenyl chloride, ClSC(:O)Cl, with an appropriate hydroxyl-containing aliphatic compound such as a monohydric or polyhydric alcohol or a polyalkylene ether polyol whereby a monofunctional or polyfunctional crosslinking or chemical modification agent of the general formula $R(OC(:O)SCl)_n$ is obtained. Preferred embodiments comprise agents prepared from monohydric or polyhydric alcohols having 1 to 12 carbon atoms wherein n is an integer of 1 to 3, indicating the number of hydroxyl groups replaced by the —SC(:O)Cl moiety. Examples of such monohydric or polyhydric alcohols are ethanol, propanol, butanol, amyl alcohol, ethylene glycol, diethylene glycol, propanediol, glycerol, trimethylol propane and the like. Ethylene glycol is particularly useful since a desirable hydroxy substituted olefin-reactive agent of the formula $HOCH_2CH_2OC(:O)SCl$ may be readily prepared by reaction with chlorocarbonyl sulfenyl chloride in equimolar amounts and is believed to constitute a novel compound.

Suitable polyalkylene ether polyols for reaction with ClSC(:O)Cl to prepare chemical modification and crosslinking agents useful in the present invention are those polymeric polyols prepared from alkylene oxides having 2 to 5 carbon atoms such as ethylene oxide, propylene oxide, butylene oxide, amylene oxide and the like and $C_2$–$C_{12}$ polyols such as ethylene glycol, propylene glycol, glycerol, trimethylol propane and the like, the polyol having about 2 to 3 hydroxyl groups. Generally, these polyalkylene ether polyols contain 5 to 30 moles of alkylene oxide per hydroxyl group. Examples include polyethylene ether glycol, polypropylene ether glycol and polybutylene ether glycol. Particularly preferred are polyethylene glycols and polypropylene glycols of molecular weight about 200 to 2000.

Polyfunctional crosslinking agents of the present invention may be prepared by reacting a monofunctional compound such as hydroxy substituted aliphatic oxycarbonylsulfenyl chloride with additional chlorocarbonyl sulfenyl chloride whereby a bis-sulfenyl chloride compound having the following formula is formed: $ClS(O:)CO-(CH_2CH_2)-_nOC(:O)SCl$; in the alternative a difunctional compound could be prepared by reacting an appropriate diol such as 1,3-propanediol with a molar excess of chlorocarbonyl sulfenyl chloride whereby 1,3-propane-bis-oxycarbonylsulfenyl chloride is formed. Polyfunctional compounds are prepared generally by providing 1 mole of chlorocarbonyl sulfenyl chloride for each hydroxyl group in the polyhydric alcohol or polyol.

The crosslinking agents of the present invention find particular utility in the preparation of crosslinked elastomeric foams, since gaseous HCl liberated as a by-product of this crosslinking reaction under certain conditions when the polymer contains trisubstituted olefinic carbon atoms as explained in detail below. For example, a crosslinked butyl rubber (isoprene-isobutylene copolymer) foam may be prepared by reacting the butyl rubber elastomer with the crosslinking agent at room temperature, and such crosslinked foams constitute a further embodiment of the present invention. The HCl gas serves as an in situ blowing agent in the production of such foams.

The chemical modification and crosslinking agents of the present invention are employed in stoichiometric proportions relative to the quantity of unsaturated polymer being treated. For each equivalent of reactive olefinic linkage there will be used one equivalent —OC(:O)SCl group. Thus, a typical crosslinking reaction would employ one mol of a difunctional compound of the formula $R(OC(:O)SCl)_2$ for every two equivalents of unsaturation in the crosslinkable olefin-containing polymer.

A wide variety of olefin-containing polymers may be crosslinked or chemically modified in accordance with the present invention. It has been found that the alkoxycarbonylsulfenyl chloride crosslinking agents of the present invention exhibit high efficiency in their reaction with the olefinic structure and are effective even when the polymer is a low unsaturation polymer such as a polymer which contains only two olefinic linkages per molecule. Thus, the invention has general applicability to olefin-containing polymers.

The following categories of unsaturated polymers are within the scope of the present invention.

Synthetic and natural rubber hydrocarbon elastomers such as natural rubber, synthetic polyisoprene rubber, styrene-butadiene rubber, butadiene-acrylonitrile rubber, butadiene-acrylic acid copolymers, polybutadiene rubber, polyisobutylene, ethylene propylene copolymers and terpolymers (EPDM), butyl rubber, polychloroprene and similar elastomers derived from 1,3-dienes. Reactions with these elastomers constitute preferred embodiments, particularly reactions with low unsaturation elastomers such as butyl rubber or EPDM polymers. The term "EPDM" is used herein as defined in ASTM-D-1418-64 and is intended to mean a terpolymer containing ethylene and propylene in the backbone and a diene, such as ethylidene norbornene, in the side chain. Butyl rubber refers to copolymers of isoolefins and conjugated dienes which comprises about 0.5 to about 15 mole % conjugated diene and about 85–99.5% isoolefin.

Other suitable polymers are the vinyl and vinylidene polymers such as the styrene polymers which include unsaturated copolymers of styrene with other vinyl monomers, polymers of derivatives of styrene and mixtures of polystyrene and styrene-containing copolymers with elastomers, such as copolymers with acrylonitrile and copolymers with fumaronitrile, fumarate esters and maleic anhydride, blends or copolymers of polystyrene or styrene-acrylonitrile copolymers with an elastomer such as a butadiene-acrylonitrile copolymer (ABS resins).

Also suitable are the olefinically unsaturated acrylic polymers such as poly(methacrylate) and higher alkyl methacrylate polymers and polyacrylonitrile.

Also suitable are the polyvinyl ester and related polymers such as polyvinyl acetate and copolymers thereof such as ethylacrylate copolymers. Other vinyl polymers as exemplified by poly(vinyl carbazole), poly(vinyl oxazolidinone), polyvinyl ethers, polyvinyl ketones, and coumaroneindene resins.

Also suitable for use in the present invention are the unsaturated polyester resins in which the di-basic acid or the glycol contain olefinic unsaturation, such as polyesters based on maleic anhydride or fumaric acid and ethylene or propylene glycol. These unsaturated polyester resins generally also contain a vinyl monomer such as styrene. Also suitable are allyl resins and polymers derived from esters of alcohol and di-basic acids such as diallyl phthalate and diallyl isophthalate, as well as the allyl carbonate resins. Also suitable are the alkyd resins which are unsaturated polyesters in which the alkene linkage resides in a fatty acid component such as oleic acid or linoleic acid. The crosslinking agents of the present invention may also be used for modification of polyolefins and polysiloxanes containing a pendant vinyl group such as polyethylene and polymethylsiloxane or polyphenylmethylsiloxane.

Also suitable are the polyepoxide compounds including polymers and copolymers of epoxy-containing monomers possessing at least one polymerizable ethylenic linkage as exemplified by poly(allyl 2,3-epoxypropyl ether), allyl 2,2-epoxypropyl ether styrene copolymer and poly $C_4$-glycidyl oxystyrene.

Further embodiments of the present invention constitute the addition products of the aforesaid olefin-containing polymers with the aliphatic oxycarbonylsulfenyl chloride compound.

It should be noted that the addition reaction will proceed at different rates and with somewhat different final products depending upon the structure of the olefin-containing polymer being treated in accordance with the present invention. Generally speaking, these products may be described as chemically modified (including crosslinked) derivatives of olefinically unsaturated polymers, the polymer being modified by addition thereto at the site of olefinic unsaturation of an aliphatic organic oxycarbonylsulfenyl chloride compound having the formula $R(OC(:O)SCl)_n$, n being an integer of at least 1, and preferably 2 to 3, said polymer having at least one olefinic linkage reactive with said aliphatic organic oxycarbonylsulfenyl chloride compound.

It has been found that if the polymer being treated in accordance with the present invention is a rubber hydrocarbon elastomer containing a trisubstituted or tetrasubstituted olefin then dehydrochlorination may also occur as part of the overall addition reaction with attendant loss of HCl taking place and formation of another adjacent olefinic carbon atom linkage as a consequence of the dehydrochlorination. Such a reaction sequence may be generalized by the following equation:

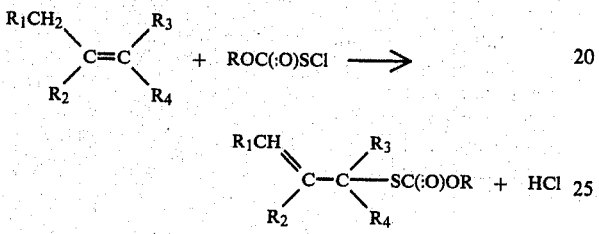

In the above equation $R_1$, $R_2$, $R_3$ are alkyl groups and $R_4$ is alkyl or hydrogen.

In other instances when the olefin is usually mono- or disubstituted and sometimes even when trisubstituted, the addition reaction may proceed by addition of a chlorine atom to one olefinic carbon atom and the addition of the rest of the aliphatic oxycarbonylsulfenyl radical to the other olefinic carbon atom by linkage with the sulfur moiety. The product of this addition reaction may be represented as follows:

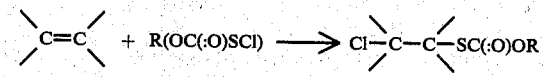

The present invention, therefore, comprises both polymeric products crosslinked or chemically modified at the site of olefinic unsaturation by either of the afore-described generalized structures. As noted above, crosslinked products require, by definition, the use of a polyfunctional oxycarbonylsulfenyl chloride compound, that is, one in which n represents an integer of 2 to 4, but n may be greater such as up to about 6 to 8.

Preferred embodiments constitute chemically modified or crosslinked derivatives of the hydrocarbon rubber diene elastomeric polymers, particularly low unsaturation polymers such as EPDM or butyl rubber.

The formation of stable adducts by the reaction of equimolar proportions of $C_2$ to $C_{12}$ polyols, the polyols being alkanediols or triols such as ethylene glycol, glycerol, hexanediol, hexanetriol, diethylene glycol, triethylene and tetraethylene glycol, trimethylol propane, dodecanediol and the like having the formula $R'(OH)_a$, $a=2$ or 3, $R'$ being the $C_2-C_{12}$ alkyl portion and chlorocarbonyl sulfenyl chloride is considered to be a further embodiment of the present invention, that is, such adducts are believed to constitute novel compositions of matter. Adducts with ethylene glycol, glycerol and trimethylol propane (TMP) are preferred. It is surprising, for example, that ethylene glycol and chlorocarbonyl sulfenyl chloride will react in a 1:1 molar ratio to form 2-hydroxyethoxylcarbonyl sulfenyl chloride, a stable product having the formula $HOCH_2CH_2OC(:O)SCl$ in appreciable yields, such as the yield of about 70%, as demonstrated by the results of Example 2(a). With triols, such as glycerol and TMP, one of the hydroxyl groups will undergo reaction with an equimolar amount of $ClC(:O)SCl$.

The aforesaid stable adducts may be generalized by the following formula: $(HO)_aR'—OC(:O)SCl$ where a is 1 or 2 and $R'$ represents the alkyl portion of the polyol.

Weiss et al in W. German Offenlegungsschrift No. 1568632 (Published Mar. 19, 1970) make no mention whatsoever of the possibility of formation of the 1:1 equimolar adduct with ethylene glycol and specifically disclose at page 3 that when bifunctional alcohols are used the quantity of chlorocarbonyl sulfenyl chloride is increased correspondingly so that the amount is double the quantity used for a reaction with a monohydric alcohol.

The invention is further illustrated by the following examples which are not to be considered as limitative of its scope.

EXAMPLE 1

This example illustrates the preparation of chlorocarbonyl sulfenyl chloride, the precursor to various coupling agents. In a one liter flask with dropping funnel, 211 ml $H_2SO_4$ (conc.) is combined with 18 g water, and 1 mole of $CCl_3SCl$ is then added dropwise to the stirred solution at 45° to 50° C. Upon completion of the addition, two phases form with pure $Cl—C(:O)—SCl$ ($n_D^{20.5} = 1.5158$) comprising the upper phase. This reagent is combined with a mono- or polyhydric alcohol to form the crosslinking agents of the present invention.

EXAMPLE 2

This example demonstrates the preparation and use of crosslinking agents of the formula $ROC(:O)SCl$ wherein R is an alkyl group containing hydroxyl (—OH) functionality, and in particular the preparation and use of 2-hydroxyethoxycarbonylsulfenyl chloride.

(a) Experimentally, 0.2 mol (26.2 g) of chlorocarbonyl sulfenyl chloride was added dropwise to a THF (tetrahydrofuran) solution of 0.2 mol of ethylene glycol (12.2 g in 100 ml THF). The exothermic process was maintained at about 25° C. with external cooling. The formation of $HOCH_2CH_2OC(:O)SCl$, 2-hydroxyethoxycarbonyl sulfenyl chloride, was confirmed by IR and NMR spectra. Five minutes after addition, 0.2 mol (22.6 g) of 2,4,4-trimethyl-2-pentene (diisobutylene-2) was added gradually. Reaction temperature was maintained at 25° C. by external cooling. After stirring the reaction mixture at room temperature for several hours, the solvent was removed by evaporation and the concentrate (45 g) was vacuum distilled. A fraction was obtained boiling at 97°–100° C. (0.04 mm) and weighing 33 g (about 70% yield) having IR and NMR spectra consistent with the proposed structure of 2-hydroxyethyl S-(2,4,4-trimethyl-1-penten-3-yl)-thiocarbonate.

Anal. calcd. for $C_{11}H_{20}O_3S$: %C, 56.86; %H, 8.68; %S, 13.80. Found: %C, 56.31; %H, 8.23; %S, 13.92.

(b) Experimentally, 0.1 mol of $HOCH_2CH_2OC(:O)SCl$ in 100 ml of THF was added to 371 g of "Butyl LM" (isobutylene-isoprene copolymer, mol wt. ≈32,000) in 500 ml THF, and the mixture was allowed to stir overnight at room temperature. The polymer adduct solution was washed three times with 150 ml portions of water, and dissolved in a liter of pentane. After drying over $Na_2CO_3$, the pentane solution was rotoevaporated at 50° C. for several hours.

To demonstrate that hydroxyl functionality had been introduced permanently into the polymer, the following experiment was performed. 10 g of the adduct with Butyl LM was dissolved in 50 cc dry $CH_2Cl_2$. 5 ml portions of this solution were combined with aliquots of a solution of 2.4 g toluene diisocyanate in 100 ml of dry $CH_2Cl_2$. The range of isocyanate equivalent amounts added was from about 0.45 to 1.1, corresponding to the molar equivalence of hydroxyl expected in the polymer. The $CH_2Cl_2$ was removed in a vacuum oven and the solvent free polymer and isocyanate were heated at 80°-100° C. for various periods of time up to 5 days, these times being typical of those needed to complete uncatalyzed alcohol-isocyanate reactions. At all concentrations of isocyanate rubber networks which were insoluble in cyclohexane were formed, e.g., the Butyl LM adduct analyzed for 0.74% S indicating $2.3 \times 10^{-4}$ moles of crosslinking agent per gram of polymer had been attached. In the range of 0.8:1 to 1:1 NCO:S concentrations some 80% of the rubber was rendered insoluble in cyclohexane by the isocyanate cure. This value is typical of cures of Butyl LM attainable using classical olefin coupling vulcanization. Thus, the Butyl LM had been rendered crosslinkable with isocyanates by the addition of the sulfenyl chloride compound of the present invention.

EXAMPLE 3

In this example, polyfunctional crosslinking agents are prepared by reacting diols with molar excesses of chlorocarbonyl sulfenyl chloride.

(a) Experimentally, 0.1 mol (6.2 g) of ethylene glycol was dissolved in 100 ml of THF. The stirred solution was then treated with a molar excess, 0.3 mol (39.3 g), of chlorocarbonyl sulfenyl chloride by adding the latter dropwise to the THF solution at room temperature. The mixture was stirred overnight, and then rotoevaporated to remove the excess ClSC(:O)Cl and solvent. The crude product (26 g) featured an infrared spectrum consistent with the bis-adduct, i.e., no HO— absorption band, a strong ester carbonyl band at 5.7 microns and a very intense C—O stretching band at 8.8 microns. The proton NMR spectrum of the distilled product, b.p. 110°-115° C. (0.05 mm) featured a sharp singlet at 5.37 tau, confirming the structure: ClS(O:C-)OCH$_2$CH$_2$OC(:O)SCl.

Anal. calcd. for $C_4H_4Cl_2O_4S_2$: %C, 19.13; %H, 1.60; %Cl, 28.24; %S, 25.50. Found: %C, 19.48; %H, 1.85; %Cl, 28.70; %S, 27.41.

(b) In a similar manner, 0.1 mol (7.6 g) of 1,3-propanediol in 100 ml of THF was treated with 0.3 mol (39.3) chlorocarbonyl sulfenyl chloride by adding the latter reagent dropwise to the THF solution. The reaction mixture was stirred at room temperature overnight. The excess ClSC(:O)Cl and solvent were removed from the product by rotoevaporation. The infrared spectrum of the crude product featured strong absorption bands at 5.7 (ester carbonyl) and 8.8 microns (C—O stretching frequency); a band due to —OH absorption was absent from the spectrum. NMR analysis revealed the presence of two methylene proton signals centered at 5.52 (triplet) and 7.83 (pentuplet) tau with the expected intensity ratio (2:1), thereby confirming the desired structure.

Anal. calcd. for $C_5H_6Cl_2O_4S_2$: %C, 22.65; %H, 2.28; %Cl, 26.74; %S, 24.19. Found: %C, 23.56; %H, 2.18 %Cl, 29.59; %S, 22.38.

EXAMPLE 4

This example demonstrates the use of the bis-carbonyl sulfenyl chloride crosslinking agent of Example 3(a) in the preparation of a crosslinked rubbery foam.

At 23° C. a solution of an isoprene-isobutylene copolymer (Butyl LM as defined in Example 2) was combined with varying proportions of the crosslinking agents using hand stirring. The polymer solution was made by combining 8 g of Butyl LM with enough heptane to obtain 10 cc volume. The amounts of crosslinking agents added are shown in the table.

Upon mixing, the crosslinking process begins and over a period of a few minutes a crosslinked foam is produced as HCl is evolved. Upon analysis by standard techniques, it was found that the rubber was crosslinked to varying degrees depending on the amount of bis compound added. The state of crosslinking is measured by the amount which the rubber swells and how much is insoluble in the solvent cyclohexane. The polymer is completely soluble prior to crosslinking. Data appear in Table I.

TABLE I

| Run No. | Butyl, LM, g | Sulfenyl Chloride, g | Cyclohexane Swell | % Insoluble |
|---|---|---|---|---|
| 1 | 4 | .32 | 7.5 | 96 |
| 2 | 4 | .26 | 7.4 | 95 |
| 3 | 4 | .16 | 9.3 | 88 |
| 4 | 4 | .12 | 10.1 | 81 |
| 5 | 4 | .053 | 64.5 | 38.6 |
| 6 | 4 | .023 | — | 4.1 |
| 7 | 4 | .010 | — | — |

EXAMPLE 5

This example demonstrates the use of the bis-carbonyl sulfenyl chloride prepared in Example 3(a) to prepare crosslinked networks containing no voids or cellular foam structure even when the polymer contains unsaturation as a trisubstituted olefin. 5 g of Butyl LM from Example 4 was dissolved in adequate toluene to obtain 10 cc total volume, 4 g of the bis-sulfenyl chloride and an equimolar amount of propylene oxide (to absorb and neutralize HCl by-product) were added and stirred in. This solution was deposited as a uniform film on a rigid surface covered with Mylar ®, a polyester film. The solvent was permitted to evaporate at 23° C. A homogeneous solid sheet of crosslinked rubber is formed.

The sheet has a tensile strength of 115 lbs/in$^2$ and an extensibility at break of 470% when stretched at a rate of 10"/min at 23° C. The network has a swell ratio of 8.8 in cyclohexane and >77% of the polymer is insoluble in this solvent, thereby indicating that extensive crosslinking had occurred. These values are representative of those obtained with other curatives and this polymer; data is reported in Table II.

TABLE II

| Cure[1] | Butyl LM, g | Sulfenyl Chloride, g | Propylene Oxide, g | Tensile[2] | Elongation | Cyclohexane Swell | %[3] Insoluble |
|---|---|---|---|---|---|---|---|
| 1 | 5 | .1 | .05 | — | — | (5.8) | 1.5 |
| 2 | 5 | .2 | .10 | — | — | 33 | >51 |
| 3 | 5 | .3 | .14 | — | — | 22.4 | >74 |

TABLE II-continued

| Cure[1] | Butyl LM, g | Sulfenyl Chloride, g | Propylene Oxide, g | Tensile[2] | Elongation | Cyclohexane Swell | %[3] Insoluble |
|---|---|---|---|---|---|---|---|
| 4 | 5 | .4 | .19 | 115 psi | 470% | 8.8 | >77 |

[1]Room temperature cures ~50%, Solution Butyl LM in toluene
[2]10″/minute
[3]No correction for propylene oxide

EXAMPLE 6

0.1 mole (13.4 grams) of TMP (2-ethyl-2(hydroxymethyl)-1,3-propanediol) was dissolved in 100 ml of THF. The stirred solution was then reacted with chlorocarbonyl sulfenyl chloride (CSC) at room temperature by dropwise addition of 0.1 mole (13.1 grams) of CSC in 100 ml of THF. After addition, the reaction mixture was stirred for an hour. Infrared analysis of the concentrated reaction mixture showed a prominent ester carbonyl absorption band at 5.75 microns, indicating that formation of the desired equimolar adduct, 2,2-bis-(hydroxymethyl)-1-butoxycarbonylsulfenyl chloride was essentially complete.

0.1 mole of polybutene (Mw about 960) was gradually added to the THF solution of the adduct prepared in part above. During addition of polybutene, the reaction temperature rose from 24° to 33° C. The reaction mixture was stirred at room temperature overnight and concentrated by rotoevaporation at 65° C. for 3 hours. The infrared spectrum of the product featured prominent hydroxyl and ester absorption bands at 3.05 and 5.90 microns respectively. The product was diluted with an equal weight of mineral oil and washed once with methanol. The methanol-free product analyzed for 1.80% sulfur, 2.60% oxygen and 0.2% chlorine.

EXAMPLE 7

In a procedure similar to Example 6, 0.1 mole (9.2 grams) of glycerol in 100 ml of THF was treated with 0.1 mole (13.1 grams) of CSC at 33° C. After stirring the THF solution for an hour, 0.1 mole (117 grams of polybutene, molecular weight about 960) was added to the THF solution of the glycerol-CSC adduct, 2,3-bis-hydroxy-1-propoxycarbonylsulfenyl chloride, and the reaction mixture was allowed to stir overnight at room temperature. Infrared analysis revealed prominent hydroxyl and ester bands at 3.05 and 5.91 microns. The methanol washed product as a 50% solution in neutral oil analyzed for 1.61% sulfur, 2.39% oxygen and 0.22% chlorine.

EXAMPLE 8

According to the method of Examples 6 and 7, 0.1 mole (15.0 grams) of triethylene glycol in THF solution was reacted with 0.1 mole (13.1 grams) of CSC at room temperature. The resulting adduct, $HOCH_2CH_2OCH_2CH_2OCH_2CH_2O-C(:O)SCl$, was subsequently treated with a molar equivalent of the polybutene of Examples 6 and 7. The concentrated product was diluted with an equal weight of a neutral oil. The diluted product analyzed for 1.12% sulfur and 2.19% oxygen, and featured an infrared spectrum with absorption bands at 3.0 (hydroxyl) 5.91 (ester carbonyl) 6.15 and 11.1 (olefin unsaturation) microns.

EXAMPLE 9

According to the procedure in Example 6, 0.1 mole (19.4 grams) of tetraethylene glycol in 100 ml of THF was reacted with 0.1 mole (13.1 grams) of CSC at room temperature. After stirring the reaction mixture at 25° C. for three hours, 0.1 mole (100 grams) of polyisobutene (molecular weight about 980) was added to the THF solution of the adduct, $HOCH_2CH_2OCH_2CH_2OCH_2CH_2OCH_2CH_2OC(:O)SCl$. The mixture was stirred overnight at room temperature and then concentrated by evaporation. The product was diluted in pentane, washed with methanol and rotoevaporated at 90° C. for several hours. Elemental analysis showed the neat product to contain 2.57% sulfur and 4.55% oxygen.

EXAMPLE 10

According to the method of Example 6, 0.1 mole (40.0 grams) of polyethylene glycol having a molecular weight of 400 dissolved in 100 ml of THF was treated with 0.1 mole (13.1 grams) of CSC at room temperature. After adduct formation was complete as indicated by infrared analysis, 0.1 mole of polybutene (of Example 6) was added at room temperature and the resulting mixture stirred overnight. The product was freed of THF solvent, then redissolved in pentane, washed twice with 200 ml portions of methanol and finally concentrated by rotoevaporation at 90° C. to constant weight. The product, diluted with an equal weight of neutral oil, analyzed for 1.00% sulfur and 3.02% oxygen.

What is claimed is:

1. A chemically modified derivative of an olefinically unsaturated polymer, said polymer selected from the group consisting of synthetic and natural hydrocarbon elastomers, vinyl and vinylidene polymers, olefinically unsaturated acrylic polymers, polyvinyl esters and copolymers thereof, unsaturated polyesters, and allyl polymers, said polymer being modified by addition thereto at the site of the olefinically unsaturated carbon atoms of an aliphatic organic oxycarbonyl sulfenyl chloride compound of the formula $R(OC(:O)SCl)_n$, n being an integer of at least 1 and up to about 8 and R being an alkyl or substituted alkyl having 1 to 12 carbon atoms, said substituents on said substituted alkyl comprising hydroxyl, chloro, nitro, oxy, oxycarbonyl or a $C_1$-$C_4$ alkyl or alkoxy-substituted silyl group.

2. The product of claim 1 wherein said polymer is a hydrocarbon rubber elastomer.

3. The product of claim 2 wherein said elastomer is butyl rubber or EPDM.

4. The product of claim 1 wherein the polymer is a rubber hydrocarbon elastomer containing a trisubstituted olefin, said product being further characterized by addition of at least one —SC(:O)OR moiety to said olefinically unsaturated carbon atom, said other olefinically unsaturated carbon atom being dehydrochlorinated.

5. The product of claim 1 wherein n is an integer of 2 to 3.

6. The product of claim 4 wherein n is an integer of 2 to 3, the polymer is butyl rubber or EPDM and the product is a crosslinked product.

7. The product of claim 2 wherein said sulfenyl chloride compound is $HOCH_2CH_2OC(:O)SCl$.

* * * * *